United States Patent
Downey et al.

(10) Patent No.: US 6,264,158 B1
(45) Date of Patent: Jul. 24, 2001

(54) STRUCTURAL SUPPORT FOR SEAT TRACK ASSEMBLY

(75) Inventors: Hugh D. Downey, Barrie; Pascal Garrido; Gregory D. Collins, both of Gravehurst; Roger Freund, Port Sydney, all of (CA); Nils Olsson, Glen Ellyn, IL (US)

(73) Assignee: Dura Global Technologies, Inc, Rochester Hills, MI (US)

( * ) Notice: Subject to any disclaimer, the term of this patent is extended or adjusted under 35 U.S.C. 154(b) by 0 days.

(21) Appl. No.: 09/207,795

(22) Filed: Dec. 9, 1998

(51) Int. Cl.[7] .................................................. F16M 13/00
(52) U.S. Cl. ......................... 248/422; 248/429; 248/430; 248/419; 297/344.1; 296/65.18
(58) Field of Search .................................... 248/424, 422, 248/429, 430, 419, 420, 421, 157, 405; 297/344.1, 216.1, 311, 452.18; 296/65.15, 65.13, 65.18; 310/83; 464/180; 74/89.14

(56) References Cited

U.S. PATENT DOCUMENTS

| 5,280,987 | | 1/1994 | Miller | 296/65.1 |
|---|---|---|---|---|
| 5,316,258 | * | 5/1994 | Gauger et al. | 248/548 |
| 5,507,552 | * | 4/1996 | Ineich et al. | 297/216.1 |
| 5,707,035 | * | 1/1998 | Kargol et al. | 249/429 |
| 5,797,576 | * | 8/1998 | Gauger | 248/429 |
| 5,816,555 | * | 10/1998 | Ito et al. | 248/429 |
| 5,909,866 | * | 6/1999 | Vaidyanathan et al. | 248/429 |
| 5,924,668 | * | 7/1999 | Garrido | 248/419 |
| 5,988,581 | * | 11/1999 | Freund et al. | 248/429 |
| 6,000,757 | * | 12/1999 | Sovis | 297/344.1 |
| 6,007,039 | * | 2/1999 | Olsson et al. | 248/424 |
| 6,021,990 | * | 2/2000 | Freund | 248/429 |
| 6,092,873 | * | 7/2000 | Downey et al. | 297/344.1 |
| 6,145,914 | * | 11/2000 | Downey et al. | 296/65.18 |
| 6,179,265 | * | 1/2001 | Downey et al. | 248/429 |

* cited by examiner

*Primary Examiner*—Ramon O. Ramirez
*Assistant Examiner*—Kimberly Wood
(74) *Attorney, Agent, or Firm*—Porter, Wright, Morris & Arthur

(57) ABSTRACT

A support structure for a vehicle seat assembly which allows the seat position to be adjusted forwardly or rearwardly with respect to the vehicle. The seat support structure is mounted to a vehicle structure and includes a first track, a second track, a torque tube and a brace member supported for movement relative to the first track with the seat bottom being supported on the second track for movement relative to the first track. A restraint bracket which is attached to the seat belt is adjacent the torque tube and second track without the necessity of fasteners. The restraint bracket mounting allows a force to be transferred to the associated torque tube, first track, and second track. The present invention further provides a method of seat assembly in which the torque tube is maintained under compression and the brace member under tension to provide a rigid, integral seat support structure.

17 Claims, 3 Drawing Sheets

STRUCTURAL SUPPORT FOR SEAT TRACK ASSEMBLY

BACKGROUND OF THE INVENTION

The present invention relates to a seat adjuster for a seat track assembly with a unique support configuration, specifically, the torque tube and brace members provide support for the seat and an attachment point for a passenger restraint.

Seat adjusters are often used in seat assemblies for selectively adjusting the position of a vehicle seat. Typically a first track member is fixed to a vehicle structure, such as a floor, and a second track member is supported on the first track member for movement relative to the first track member such that the seat position can be adjusted forwardly or rearwardly within the vehicle. The adjustment of the seat assembly is controlled by either a mechanical actuator, an electrical actuator, or an electromechanical actuator.

Typically, vertical seat adjustment is accomplished by torque tubes that actuate a drive link assembly that is connected to a seat bottom. An input is provided to the torque tube which rotates causing the drive links to move the seat bottom between a raised and lowered position.

Mounting the torque tubes in this configuration can cause the seat to be somewhat unstable. Also, these known seat adjustment assemblies require a complex mounting arrangement to attach the passenger restraint. This requires a significant number of parts that require a great deal of packaging space, and which make the assembly expensive.

Thus, it would be desirable to have a seat adjustment assembly with a support structure that improves seat stability and provides effective passenger restraint attachment points while reducing the overall number of parts. It would also be desirable to have a seat adjustment assembly that provides sufficient strength with fewer parts so that assembly cost and overall assembly weight can be reduced, and available packaging space for other components is increased.

SUMMARY OF THE INVENTION

The present invention provides a unique structural support for a vehicle seat that avoids the problems described above. Further, the present invention provides an attachment point for a passenger restraint that transfers force to the seat support structure.

In a disclosed embodiment, a seat mounting assembly includes a first and second track defining a longitudinal axis. The first track is mounted to a vehicle structure and the second track is supported for linear movement relative to the first track along the longitudinal axis. The assembly further includes at least one torque tube for providing vertical seat adjustment and at least one brace member to provide rigidity to the seat support structure.

In one embodiment, the torque tube and brace member define a horizontal axis transverse to the longitudinal axis. A link is fixedly attached to the torque tube for rotatably actuating the torque tube and a restraint bracket is preferably mounted to the torque tube between the link and the second member. Upon receipt of a force the restraint bracket preferably deforms and transfers the force directly to the torque tube and track assemblies. This further improves the structural integrity of the seat while the total number of structural components is reduced to thereby provide a light weight and inexpensive support structure which does not require fasteners.

Additionally, the structural integrity of the present invention is increased by a particular assembly method. Preferably, the torque tubes are maintained under compression and the brace member or members maintained under tension. By maintaining opposing forces on the horizontal axis members, structural integrity and rigidity of the overall assembly is increased.

The present invention therefore provides a support structure for a seat adjuster that is durable, easily installed, easily maintained, and inexpensive. These and other features can be understood from the following specification and drawings.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
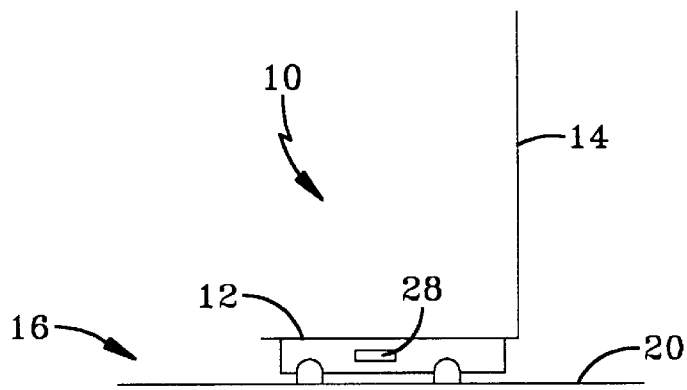
FIG. 1 is a side schematic view of a seat assembly incorporating the inventive torque tube configuration.

A vehicle seat assembly 10, shown in FIG. 1, includes a seat bottom 12 and a seat back 14 supported with respect to the seat bottom 12. A seat mounting assembly 16 is used to mount the seat assembly 10 to a vehicle structure 20. An actuator 28 is used to adjust the position of the seat 10. The adjustment can be controlled by a mechanical actuator, an electrical actuator, or an electromechanical actuator.

Figure 2:
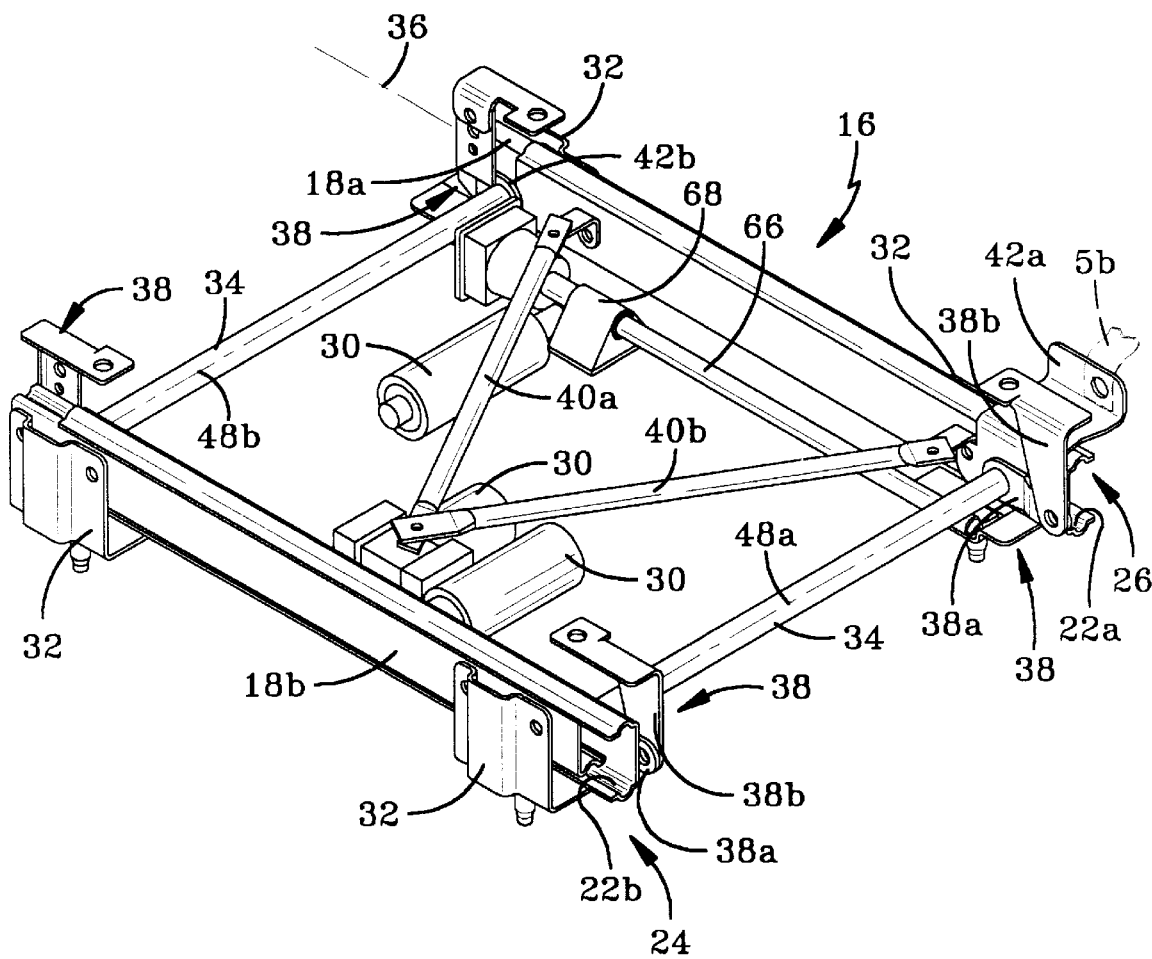
FIG. 2 is a perspective view of a seat track assembly incorporating the inventive torque tube configuration.

As shown in FIG. 2, the seat mounting assembly 16 includes first tracks 18a, 18b that are stationarily mounted to the vehicle structure 20 and second tracks 22a, 22b that slide with respect to the first tracks 18a,18b. The track assemblies 18a,18b,22a,22b define a longitudinal axis 36. The seat bottom 12 (FIG. 1) is supported on the second track 22a,22b for movement with the second track 22a,22b for seat adjustment between forward or rearward positions. Preferably, the first tracks 18a,18b are outer or lower tracks mounted to the vehicle floor and the second tracks 22a,22b are inner or upper tracks that slide along the first tracks. However, it should be noted that the terms inner, outer, forward, rearward, stationary, movable, upper, and lower, as used in this description, are for illustration purposes only and cannot be considered limiting.

The actuator 28, shown in FIG. 2, is used by a seat occupant for selectively providing input to the mounting assembly 16 to control the movement of the second track assembly 22a,22b with respect to the first track assembly 18a,18b. The actuator 28 is preferably an electrical switch assembly that actuates various electrical motors 30 to move the seat back 14 and seat bottom 12 between a variety of seat positions. The actuator can control horizontal seat position, vertical seat position, and/or the angular position of the seat back 14 relative to the seat bottom 12. The actuator 28 is operably connected to both the inboard 24 and outboard 26 track assemblies. The terms inboard and outboard are used in this description for clarity and illustration purposes only and cannot be considered limiting.

Brackets 32 are used to mount the first track assembly 18a,18b to the vehicle floor on both the inboard 24 and outboard 26 sides. Vertical seat adjustment is accomplished by torque tubes 34 that extend from inboard track assembly 24 to the outboard track assembly 26. At least one torque tube 34 is needed to adjust the position of the seat 10 between raised and lowered positions. However, preferably two (2) torque tubes 34 are used for vertical seat adjustment. The front torque tube 34 defines a first horizontal axis 48a and the rear torque tube defines a second horizontal axis 48b. The first 48a and second 48b horizontal axes are generally parallel to one another and are both transverse to the longitudinal axis 36. Preferably, one torque tube 34 is located near the front of the seat 10 and one torque tube 34 is located near the rear of the seat 10. The torque tubes 34 work together to raise and lower the seat 10 upon receipt of input from an actuator 28 and a drive link assembly 38. The drive link assembly 38 is supported on the torque tubes 34 and is connected to the seat bottom 12 or seat pan.

At least one brace member 40 is provided to maintain the rigidity and integrity between the inboard 24 and outboard 26 track assemblies. However, preferably two (2) brace members 40 are provided. The brace member 40 can be attached in various configurations and further define the horizontal axis 48 that is transverse to the longitudinal axis 36. Preferably, a distal end of a first brace member 40a is located near the front of the seat 10 and a distal end of a second brace member 40b is located near the rear of the seat 10 along the first movable track 22a. The opposite distal ends of the first and second brace members 40a and 40b can be commonly attached to a central portion of the second movable track 22b. Although rod-like brace members are illustrated, one skilled in the art will realize that other brace members, such as a flat plate or beam structure can be equivalently provided.

Preferably, the torque tubes 34 are maintained under compression and the brace member 40 is maintained under tension to maintain opposing forces on the inboard 24 and outboard 26 track assemblies. However, one skilled in the art will understand that the opposing forces can be maintained by various configurations and orientations of at least one torque tube 34 and at least one brace member 40 which are not to be limited by only the configuration illustrated.

Figure 3:
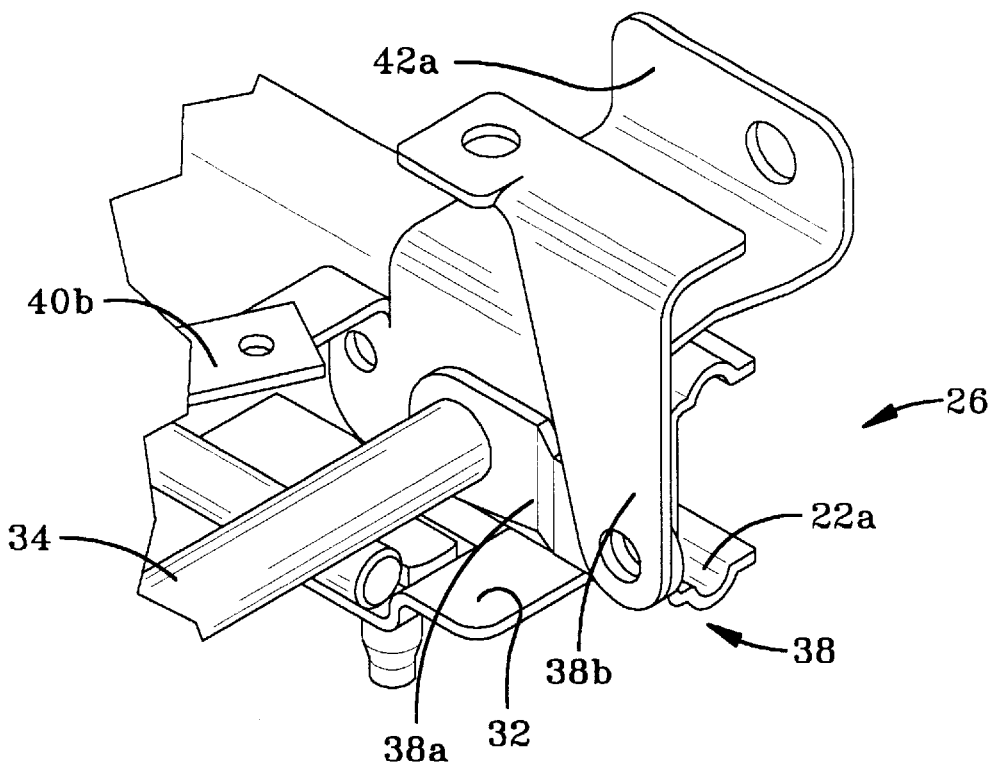
FIG. 3 is an exploded view of the seat track and restraint bracket assembly shown in FIG. 2.

The drive link assembly 38 and restraint bracket 42a are shown in greater detail in FIG. 3. The drive link assembly 38 includes a first link 38a that is fixed for rotation with the torque tube 34. A second link 38b is connected to the first link 38a at one end and is connected to a seat bottom 12 or other mounting structure at the other end. When the torque tube 34 receives input from the actuator 28 it rotates, causing the first link 38a to rotate. As the first link 38a rotates the second link 38b also moves resulting in the seat bottom 12 moving in either an upward or downward direction.

Aspects of the torque tube and the links are described in copending application Ser. No. 09/207,128 filed Dec. 12, 1998 and entitled "Torque Tube for Seat Track Assembly".

The torque tube 34 is preferably passed through the restraint bracket 42a and located between the first link 38a and the movable track 22a. The restraint bracket can be retained by only the first link 38a and the movable track 22a, or can be "tack" welded or the like. It will be understood that the "tack" weld is to reduce the possibility of noise from vibration or the like but is not required for structural retention. The restraint bracket 42a is secured to the seat belt, shown schematically at 5b in FIG. 2. Accordingly, the torque tube 34 is mounted through the restraint bracket 42a and sandwiched between the first link 38a and the movable track 22a. The restraint bracket 42a can therefore be retained without the necessity of structural fasteners, welding, or like while allowing the torque tube 34 to rotate within.

Upon receipt of a force the restraint bracket 42a preferably deforms and aligns the applied force along the longitudinal axis 36 of the stationary 18 and movable 22 track. The restraint bracket 42a transfers the applied force to the associated torque tube 34, the stationary track assembly 18, and the movable track assembly 22 to thereby decrease the amount of force which must be sustained by any single member. By transferring the load path directly from the restraint bracket 42a to the torque tube 34 and the track assemblies 22,18, the seat belt 5b is not limited to the integrity of fasteners and thereby reduces the probability of component failure. Preferably, by directing the force along the longitudinal axis 36, any track fasteners (not shown) which may encounter the force, are in shear. This further increases the structural integrity of the seat 10 while providing a light weight and inexpensive support structure mounting assembly 16.

Figure 4:
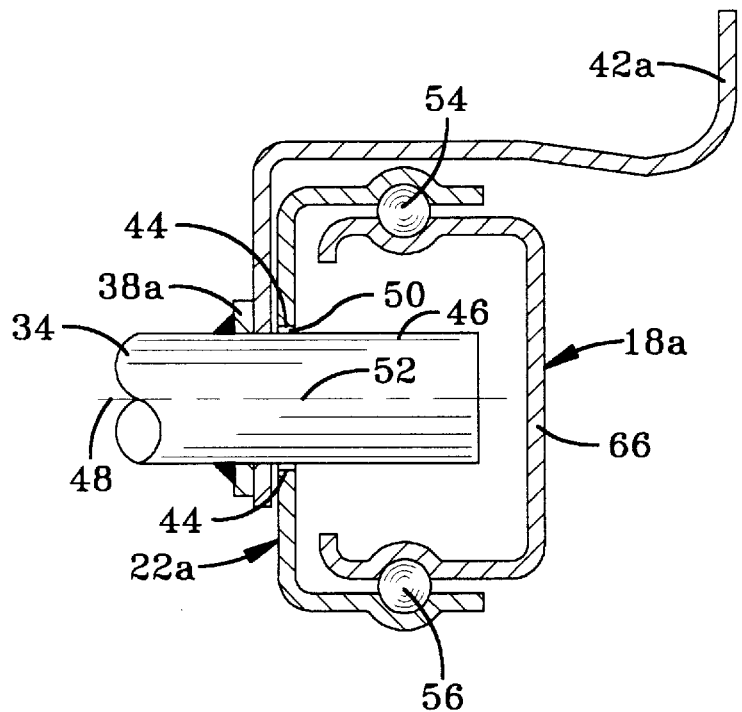
FIG. 4 is a front cross-sectional view of one embodiment of a seat track and restraint bracket assembly.

A cross-sectional view of the restraint bracket 42a installed to the torque tube 34 is shown in FIG. 4. The movable track 22a includes a first bearing surface 44. The torque tube 34 presents a second bearing surface 46 that rotatably engages the first bearing surface 44. The first bearing surface 44 is defined by an opening 50 defining a center 52 in the movable track 22a. The center 52 preferably lies on the torque tube 34 horizontal axis 48. Thus, the torque tube 34 is inserted through the opening 50 in the second track 22 and the edges of the opening 50 serve as the first bearing surface 44 that engages the second bearing surface 46 on the torque tube 34.

A first 54 and second 56 bearing assemblies slidably support the second track 22 with respect to the first track 18 and preferably comprise a plurality of ball bearings or sliders that provide smooth sliding capability between the tracks 18, 22. The vertical orientation of the tracks 18, 22 with the bearing assemblies 54, 56 being located vertically with respect to one another, allows the torque tube 34 to be inserted directly into the movable track 22a and restraint bracket 42a.

As discussed above, the restraint bracket 42a is preferably mounted to the torque tube 34 between the first link 38a and the movable track 22a. This eliminates the necessity for restraint bracket mounting brackets and fasteners which makes the seat assembly 16 much more durable, compact and cost effective. The restraint bracket 42a can be configured to conform to the movable track 22a and therefore pass under the second link 38b (FIG. 3) and seat bottom 12. As the restraint bracket 42a is mounted to the movable track 22a, the restraint bracket 42a moves with the horizontal positioning of the seat assembly 10. The restraint bracket 42a therefore provides a restraint point which maintains the correct position in relation to the seat occupant.

Similiarly, one skilled in the art will understand that a restraint bracket 42b can also provide a mounting point for an electric drive motor 30 or the like (FIG. 2). The restraint bracket 42b, a drive rod 66, and the drive rod bracket 68 thereby further prevent the second track 22 from seperating from the first track 18 when subjected to the above described force.

Figure 5:
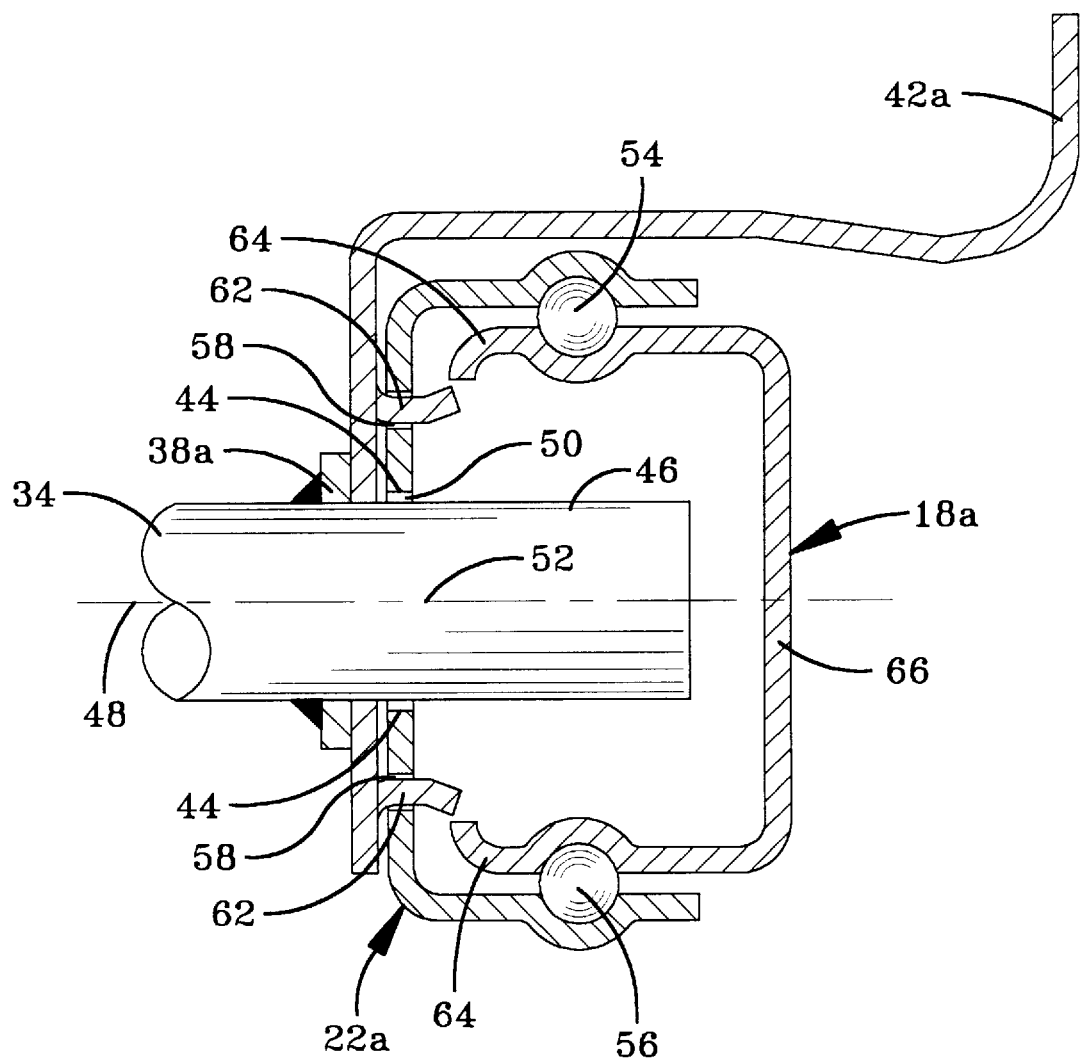
FIG. 5 is a front cross-sectional view of an alternate embodiment of a seat track and restraint bracket assembly.

An alternate embodiment of a restraint bracket 42' is shown in FIG. 5. The restraint bracket 42' further includes at least one flange 62 to further retain the restraint bracket 42'. The flange 62 extends through an opening 58 in the movable track 22a such that the flange 62 can interlock with the stationary first member 18a. By providing an extended portion 64 of the stationary first member 18a, an additional retention point is provided for the restraint bracket 42'. In other words, when the restraint bracket 42' experiences a force, the force is directly transferred to the first member 18a through engagement between the flange 62 and the extended portion 64.

The foregoing description is to be exemplary rather than defined by the limitations within. Obviously, many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims the invention may be practiced otherwise than as specifically described. For that reason the following claims should be studied to determine the true scope and content of this invention.

We claim:

1. An assembly for mounting a seat within a vehicle comprising, in combination:
   a first member to be mounted to a vehicle structure and defining a longitudinal axis;
   a second member supported for movement relative to said first member along said longitudinal axis, said second member including a first bearing surface defined by an opening;
   a torque tube for providing vertical seat adjustment, said torque tube extending into said opening and presenting a second bearing surface for rotatably supporting said first bearing surface;
   a link fixedly attached to said torque tube for rotatably actuating said torque tube; and
   a restraint bracket adjacent said torque tube, said restraint bracket positioned between said link and said second member;
   wherein said restraint bracket is adapted to be attachable to a seat belt.

2. An assembly as recited in claim 1 further comprising a brace member fixedly mounted to said first member track and said second member track.

3. An assembly as recited in claim 1 wherein said torque tube is rotatable within said restraint bracket.

4. An assembly as recited in claim 1 wherein said restraint bracket is sandwiched between said link and said second member.

5. An assembly as recited in claim 1 wherein said restraint bracket includes a flange portion extending through an opening in said second member, said flange portion engagable with said first member.

6. An assembly as recited in claim 1 wherein said restraint bracket provides a mount for a drive motor.

7. An assembly for mounting a seat within a vehicle comprising, in combination:
   a stationary track assembly having a first stationary track and a second stationary track mounted to a vehicle structure and defining a longitudinal axis;
   a movable track assembly having a first movable track and a second movable track for movement relative to said stationary track assembly along said longitudinal axis, said first movable track and said second movable track defining a first bearing surface;
   a torque tube for receiving input from an actuator, said torque tube presenting a second bearing surface rotatably supported by said first bearing surface, said torque tube providing vertical seat adjustment when said torque tube rotates due to input from said actuator; and
   a brace member fixedly mounted to said first movable track and said second movable track;
   wherein said brace member defines a horizontal axis that is diagonally traverse to said longitudinal axis.

8. An assembly as recited in claim 7 wherein said brace member defines a horizontal axis that is traverse to said longitudinal axis.

9. An assembly as recited in claim 7 wherein said brace member is a pair of brace members which define a horizontal axis that is traverse to said longitudinal axis.

10. An assembly as recited in claim 9 wherein said pair of brace members includes a first brace member defining a first horizontal axis and a second brace member defining a second horizontal axis, said first and second horizontal axes being generally parallel to one another and transverse to said longitudinal axis.

11. An assembly as recited in claim 9 wherein said pair of brace members are mounted in a V-like configuration.

12. An assembly as recited in claim 7 wherein said brace member is maintained under tension.

13. An assembly as recited in claim 7 wherein said torque tube is maintained under compression.

14. An assembly as recited in claim 7 wherein said brace member is maintained under tension and said torque tube is maintained under compression.

15. An assembly as recited in claim 7 wherein said torque tube is mounted through a restraint bracket, said restraint bracket attached to a seat belt.

16. An assembly method for a vehicle seat support structure comprising, in combination, the steps of:
   (1) providing a stationary track assembly having a first stationary track and a second stationary track which define a longitudinal axis;
   (2) attaching a movable track assembly having a first movable track and a second movable track for movement relative to said stationary track assembly along said longitudinal axis;
   (3) rotatably mounting a torque tube between said first movable track and said second movable track to define a substantially horizontal axis, said torque tube being rotatably maintained under compression between said first movable track and said second movable track;
   (4) fixedly mounting a brace member between said first movable track and said second movable track, said brace member maintained under tension between said first movable track and said second movable track; and
   (5) mounting a restraint bracket to said torque tube, wherein said restraint bracket is adapated to be attached to a seat belt.

17. A method as recited in claim 16, wherein said torque tube and said brace member exert opposing forces on said first and said second movable tracks.

\* \* \* \* \*